United States Patent [19]
Burkes et al.

[11] Patent Number: 5,422,128
[45] Date of Patent: Jun. 6, 1995

[54] STORAGE STABLE CALCIUM-SUPPLEMENTED BEVERAGE CONCENTRATES

[75] Inventors: Alice L. Burkes; Jeffrey L. Butterbaugh; George M. Fieler; William J. Gore, all of Cincinnati; Maria E. Zuniga, West Chester, all of Ohio

[73] Assignee: The Procter & Gamble Company, Cincinnati, Ohio

[21] Appl. No.: 122,733

[22] Filed: Sep. 16, 1993

Related U.S. Application Data

[63] Continuation of Ser. No. 964,315, Oct. 21, 1992, abandoned, which is a continuation-in-part of Ser. No. 814,030, Dec. 26, 1991.

[51] Int. Cl.$^6$ .................................................. A23L 2/02
[52] U.S. Cl. ......................................... 426/74; 426/599
[58] Field of Search .................................. 426/599, 74

[56] References Cited

U.S. PATENT DOCUMENTS

| | | | |
|---|---|---|---|
| 4,551,342 | 11/1985 | Nakel et al. | 426/548 |
| 4,722,847 | 2/1988 | Heckert | 426/74 |
| 4,737,375 | 4/1988 | Nakel et al. | 426/590 |
| 4,830,862 | 5/1989 | Braun et al. | 426/74 |
| 4,867,977 | 9/1989 | Gailly et al. | 424/687 |
| 4,871,554 | 10/1989 | Kalala et al. | 426/74 |
| 4,919,963 | 4/1990 | Heckert | 426/599 |
| 4,992,282 | 2/1991 | Mehansho et al. | 426/72 |
| 4,994,283 | 2/1991 | Mehansho et al. | 426/74 |
| 5,028,446 | 7/1991 | Saleeb et al. | 426/590 |
| 5,118,513 | 6/1992 | Mehansho et al. | 426/2 |

FOREIGN PATENT DOCUMENTS

| | | | |
|---|---|---|---|
| 304986 | 3/1989 | European Pat. Off. | A61K 31/91 |
| 304987 | 3/1989 | European Pat. Off. | A23L 1/19 |
| 346866 | 12/1989 | European Pat. Off. | A23L 1/304 |
| 56-097248 | 8/1981 | Japan | C07C 51/41 |
| 2207335 | 2/1989 | United Kingdom | A23L 2/00 |
| WO91-19692 | 12/1991 | WIPO | C07C 59/265 |

OTHER PUBLICATIONS

Gardner 1966 Food Acidulants Allied Chemical Corp., New York pp. 110–113.

(List continued on next page.)

Primary Examiner—Carolyn Paden
Attorney, Agent, or Firm—Rose Ann Dabek; M. B. Graff; J. C. Rasser

[57] ABSTRACT

This application relates to storage stable beverage concentrates for preparing beverages and food compositions which are nutritionally supplemented with significant levels of calcium and to a method for preparing these concentrates. The beverage concentrates have a greater than 5 fold concentration and comprise:

(a) from about 0.2% to about 1.20%, by weight, solubilized calcium;
(b) from about 0.7% to about 8.25%, by weight, of an acid component comprising a mixture of citric acid and malic acid wherein said mixture has a weight ratio of citric acid to malic acid of from about 5:95 to about 50:50;
(c) from about 0.05% to about 1.2%, by weight, of an acidic anion component selected from the group consisting of chloride ion, nitrate ion, sulfate ion and mixtures thereof;
(d) an effective amount of a flavor component; and
(e) from about 35% to about 80% sugar by weight on a dry basis;
(f) from about 20% to about 65%, by weight, water; wherein the weight ratio of said acid component to said solubilized calcium is from about 3.5 to about 6.5 and said beverage concentrate has a pH of less than or equal to about 4.5, preferably less than or equal to about 3.5. These beverage concentrates are stable at temperatures of greater than 90° F. (32° C.) for at least about 30 days. An added benefit is their stability for at least about 120 days at temperatures of from about 70° F. (21° C.) to about 90° F. (32° C.).

8 Claims, No Drawings

OTHER PUBLICATIONS

Johnston Jr. et al., "Calcium Supplementation and Increase in Bone Mineral Density in Children", N. Eng. J. Med., 327:82–87, Jul. 9, 1992.

Dawson-Hughes et al., "A Controled Trial of the Effect of Calcium Supplementation in Bone Density in Postmenopausal Women", N. Eng. J. Med. 323(13):878–881, Sep. 27, 1990.

Bishop, "Calcium Slows Bone Loss for Women Past Menopause, Experiment Shows", Wall Street Journal, Sep. 27, 1990.

Unknown, "Calcium Prevents Bone Loss in Postmenopausal Womem", Tufts University Press Release (Boston, Mass., Sep. 1990).

Hudepohl et al., "Effects of Sugar Alcohols on Calcium Bioavailability from Fruit Juices", Presentation given Apr. 1990.

Mehansho et al., "Calcium Bioavailability and Iron--Calcium Interaction in Orange Juice", J. of the Amer. College of Nutr., 8(1):61–68, 1989.

Holbrook et al., "Dietary Fructose or Starch: Effects on Copper, Zinc, Iron, Manganese, Calcium, and Magnesium Balances in Humans", Am J Clin Nutr. 49:1290–1294, 1989.

Riis et al., "Does Calcium Supplementation Prevent Postmenopausal Bone Loss?" N. Eng. J. of Med. 316(4):174–177, Jan. 22, 1987.

Nilas et al., "Calcium Supplementation and Postmenopausal Bone Loss", Brit. Med. J. 289:1103–1106, Oct. 27, 1984.

Ser. No. 07/964,316, filed Oct. 21, 1992, to M. Andon.
Ser. No. 07/964,239, filed Oct. 21, 1992, to A. L. Burkes and M. M. Fox.
Ser. No. 07/814,030, filed Dec. 26, 1991, to Zuniga et al.
Ser. No. 07/964,238, Filed Oct. 21, 1992, to Burkes et al.

STORAGE STABLE CALCIUM-SUPPLEMENTED BEVERAGE CONCENTRATES

This is a continuation of application Ser. No. 07/964,315, filed on Oct. 21, 1992, now abandoned, which is a continuation in part of application Ser. No. 07/814,030, filed on Dec. 26, 1991, now abandoned.

TECHNICAL FIELD

This application relates to storage stable beverage concentrates for preparing beverages and food compositions which are nutritionally supplemented with significant levels of calcium. This application particularly relates to beverage concentrates, of greater than 5-fold, which provide for excellent stability at high temperatures. This application further relates to a method for preparing these concentrates.

BACKGROUND OF THE INVENTION

Dietary calcium inadequacy may be a contributing cause to osteoporosis for some populations. For example, a positive correlation between calcium intake and bone mass has been found across many age groups. It has been suggested that the level of calcium intake early in life directly influences the peak bone mass achieved at skeletal maturity.

Calcium can be obtained from a variety of dietary sources. The primary sources of calcium are dairy products, in particular milk. However, beginning in young adulthood and continuing through later life, milk is typically not consumed in sufficient quantities by the general population to obtain needed levels of calcium. This may be caused by lactose intolerance as well as by the unattractiveness of milk as a drink for "social occasions."

To achieve a greater consumption of calcium throughout life, more appealing alternatives to milk are needed. Such beverages must be consumed in sufficient quantities to provide nutritionally beneficial amounts of calcium. Therefore, non-dairy product beverages which comprise a milk level of calcium, 0.12% by weight, are in demand. To this end, soft drinks and fruit juice products have been devised which are fortified with calcium.

In order to save on shipping and packaging costs, concentrated beverages are preferred. These beverages are diluted at the time of consumption. Greater than 5-fold concentrates are highly preferred for economic reasons. However, as these beverages become more concentrated, the water level decreases therefore making it more difficult to solubilize calcium and sugar.

British Patent 2,207,335, Buisson et al., published Feb. 1, 1989, discloses three-fold to five-fold beverage concentrates comprising solubilized calcium; an edible acid component comprising citric, malic, fumaric, adipic, gluconic, tartaric and lactic acids; chloride and a flavor component containing no more than 20% fruit juice on a single strength basis.

U.S. Patent 4,722,847, Heckert, issued Feb. 2, 1988, discloses three-fold to five-fold calcium supplemented fruit juice concentrates which are substantially free of added protein. The concentrates comprise solubilized calcium, an acid component comprising a mixture of citric and malic acid in specific ratios, at least 45% fruit juice, a sugar content of about 6° to 75° Brix and no more than about 0.7% chloride ion.

In developing alternatives comprising a milk level of calcium, several concerns have arisen, the first of which is stability. Due to the level of calcium salts in the beverage concentrates necessary to achieve a milk level of calcium, the precipitation of insoluble calcium salts, particularly at high temperatures, is a problem. Stability at high temperatures, greater than 90° F. (32° C.), is particularly important for storage in unair-conditioned warehouses, particularly in tropical environs, and for storage near heat sources such as those found in commercial kitchens.

Another concern is developing a calcium supplemented beverage which has desirable taste and mouthfeel qualities. The inclusion of high levels of calcium imparts significant "chalky" and/or "biting/burning" mouthfeel sensations. In addition, the inclusion of chloride ion imparts a bitter note to the flavor. In addition to providing consumer acceptable taste, the beverage needs to be visually appealing to the consumer. The inclusion of significant levels of calcium often produces a cloudy, opaque beverage. All of these concerns are further complicated by the low level of solubilizing water in greater than 5-fold beverage concentrates.

It is an object of the present invention to provide greater than 5-fold (5×) beverage concentrates which are nutritionally supplemented with calcium, are stable at high temperatures and have a consumer acceptable taste and mouthfeel as well as a soluble system, i.e., free from calcium or sugar solids.

SUMMARY OF THE INVENTION

The present invention relates to beverage concentrates, of greater than 5-fold and typically up to about 10-fold, for preparing beverages which are nutritionally supplemented with significant levels of calcium. The beverage concentrates comprise:

(a) from about 0.2% to about 1.20%, by weight, solubilized calcium;

(b) from about 0.7% to about 8.25%, by weight, of an acid component comprising a mixture of citric acid and malic acid wherein said mixture has a weight ratio of citric acid to malic acid of from about 5:95 to about 50:50;

(c) from about 0.05% to about 1.2%, by weight, of an acidic anion component selected from the group consisting of chloride ion, nitrate ion, sulfate ion and mixtures thereof;

(d) an effective amount of a flavor component; and (e) from about 35% to about 80% sugar by weight on a dry basis;

(f) from about 20% to about 65%, by weight, water; wherein the weight ratio of said acid component to said solubilized calcium is from about 3.5 to about 6.5 and said beverage concentrate has a pH of less than or equal to about 4.5, preferably less than or equal to about 3.5. These beverage concentrates are stable at temperatures of greater than 90° F. (32° C.) for at least about 30 days. An added benefit is their stability for at least about 120 days at temperatures of from about 70° F. (21° C.) to about 90° F. (32° C.).

The present invention further relates to greater than 5-fold fruit and botanical juice concentrates for preparing beverages which are nutritionally supplemented with significant levels of calcium. The flavor component for fruit and botanical juice concentrates ranges from about 1% to about 70%, by weight, of a single strength juice selected from the group consisting of fruit juices, botanical juices and mixtures thereof. In the place of single strength juices, fruit juice concentrates can be used in the range of from about 0.5% to about 25%, by weight, of the beverage concentrates.

The beverage concentrates of the present invention supply significant levels of nutritionally beneficial calcium. In addition, they possess significant stability from calcium salt precipitation at high temperatures while providing a consumer acceptable taste and mouthfeel. The most preferred beverage concentrates of the present invention provide for stability from calcium salt precipitation at 120° F. (49° C.) for at least seven days, consumer acceptable taste and mouthfeel, and a soluble system, i.e., free from calcium or sugar solids.

The most preferred beverage concentrates of the present invention are greater than about 5.5 fold and comprise:

(a) from about 0.5% to about 0.75%, by weight, solubilized calcium;
(b) from about 3.0% to about 4.0%, by weight, of an acid component comprising a mixture of citric acid and malic acid wherein said mixture has a weight ratio of citric acid to malic acid of about 26:74;
(c) from about 0.15% to about 0.3%, by weight, chloride ion;
(d) an effective amount of a flavor component;
(e) from about 45% to about 70%, sugar, by weight dry weight basis), selected from the group consisting of high fructose corn syrup, wherein the solids are at least about 50% fructose; liquid fructose; and mixtures thereof;
(f) from about 30% to about 55%, by weight, water;

wherein the weight ratio of said acid component to said solubilized calcium is from about 4 to about 6 and said beverage concentrate has a pH of less than or equal to about 3.5

The present invention further relates to a method for preparing these greater than five-fold calcium-supplemented beverage concentrates.

All ratios, proportions and percentages herein are by weight, unless otherwise specified.

Definitions:

"Beverage concentrate", as used herein, refers to a beverage product which, when diluted with the appropriate amount of water, forms drinkable beverages. Beverage concentrates within the scope of the present invention are typically formulated to provide drinkable beverages when diluted with 3 to 9 parts by weight water or 4 to 9 parts by volume water.

"Beverage premix concentrate", as used herein, refers to a beverage premix to which sugars along with optionals such as preservatives are added (normally by bottlers/manufacturers) with the appropriate amount of water to form beverage syrups or drinkable single strength beverages. Beverage premix concentrates within the scope of the present invention are typically formulated to provide drinkable beverages when combined with from about 10% to about 14% manufacturer/bottler ingredients then diluted with from about 75% to about 85% water or from about 5 to about 7 parts by volume water.

"Manufacturer/bottler ingredients" refers to sugars, typically sucrose or fructose, and optional ingredients such as stabilizers; typically fiber and clouding agents, and vitamins such as Ascorbic Acid, Vitamin C, Vitamin E, and pro A.

"Syrups," as used herein, refers to a beverage product which when diluted with the appropriate amount of water forms a drinkable beverage. Syrups as described herein are prepared by the manufacturer/bottler at generally about 6× (six fold), more generally 4× to 8×, strength such that the syrup is diluted with 5 parts water by volume to form a single strength beverage. Most people are familiar with this syrup in relation to a dispenser that gives an aliquot of syrups and water such as at a convenience store.

"Beverage" or "single-strength beverage" as used herein refers to a beverage composition in a ready-to-serve, drinkable form. Beverages of the present invention typically comprise at about 80% water. Beverages contemplated within the scope of the present invention include both carbonated and noncarbonated forms.

"Five-fold" or "5×", as used herein, is defined as a concentrate wherein one part is diluted with four parts of water by volume to achieve a single strength beverage. This requires calculation based on specific gravity to convert to by weight dilution. Similarly, "ten-fold" or "10×", as used herein, is defined as a concentrate wherein one part concentrate is diluted with nine parts of water by volume to achieve a single strength beverage.

"Water", as used herein, includes water from flavors, juice concentrates, sugar syrups and other sources, e.g., gum solutions. Water of hydration of calcium and other solids must be included.

"Solids", as used herein, are primarily the dissolved sugars, salts and flavor materials. Gums would also be included. Typically, solids are measured by the refractive index and are called °Brix. Brix approximates the sugar content of the concentrate.

"Sugars", as used herein, means a carbohydrate sweetener. Preferably these are mono and disaccharides. The sugar includes both liquid syrups and crystalline or solid sugars. Sugars are expressed on a dry weight basis, that is, a fructose syrup having 77% solids of which 55% may be fructose, (it may have a minor amount of glucose) and 23% water. One hundred grams of this syrup would provide seventy seven grams of solids and twenty three grams of water.

"Comprising", as used herein, means various components can be conjointly employed in the beverage concentrates and food compositions of the present invention. Accordingly, the terms "consisting essentially of" and "consisting of" are embodied in the term comprising.

DETAILED DESCRIPTION OF THE INVENTION

Calcium

The key nutritional component of the beverage concentrates of the present invention is calcium. Suitable sources of calcium include calcium carbonate, calcium oxide, calcium hydroxide, calcium sulfate, calcium chloride, calcium phosphate, calcium hydrogen phosphate and calcium dihydrogen phosphate, as well as the respective organic salts of calcium, e.g., calcium citrate, calcium malate, calcium tartrate or calcium lactate. Mixtures of calcium carbonate and calcium hydroxide, which optionally and preferably include calcium chloride, calcium sulfate and calcium nitrate, are particularly preferred calcium sources. Most preferred are calcium carbonate and calcium hydroxide since these salts are neutralized by the organic acid, hence forming water and carbon dioxide, in the case of the carbonate. These neutralization products do not affect the flavor or the acidity of the beverage. To be useful in the present invention, the calcium needs to be "solubilized", i.e., dissolved or suspended, in the beverage or beverage concentrate. Accordingly, the amount of calcium included in the beverage concentrates of the present invention will be referred to in terms of "solubilized calcium", i.e., the amount of calcium ion dissolved or suspended.

For the beverage concentrates of the present invention, solubilized calcium is preferably sourced from calcium carbonate, calcium hydroxide, calcium chloride, calcium sulfate, calcium nitrate and mixtures thereof.

For single strength or the drinkable beverages made from the concentrates of the present invention, calcium is present in an amount of at least 0.04% by weight. This minimum level of calcium (about $\frac{1}{3}$ to a half of milk level) provides significant nutritional supplementation from the beverage. Preferably the maximum level of calcium on a single strength basis is up to 0.26% by weight for fruit and botanical juice beverages and typically up to about 0.15% for other beverages. As the level of calcium in single strength fruit juice beverages is increased much beyond 0.26% by weight (beyond 0.15% by weight for other beverages) satisfactory taste and stability properties become much more difficult to achieve. Preferably, the level of calcium in fruit and botanical juice beverages is from about 0.10% to 0.20% by weight which includes milk level, i.e., 0.12% by weight, and from about 0.055% to about 0.09% by weight for other single strength beverages.

The beverage concentrates of the present invention comprise from about 0.2% to about 1.20% solubilized calcium. Preferably the beverage concentrates comprise from about 0.4% to about 1.0%, more preferably from about 0.5% to about 0.75%, solubilized calcium.

Acid Component

A key component for beverage concentrates of the present invention from the standpoint of stability against precipitation of insoluble calcium salts, taste and mouthfeel quality and desirable onset of sourness is the edible acid component available from added acids, single strength juices or concentrate juices. This acid component comprises a mixture of citric acid and malic acid. The mixture of citric acid and malic acid of the present invention has a weight ratio of citric acid to malic acid of from about 5:95 to about 50:50. The preferred weight ratio for citric acid to malic acid is from about 20:80 to about 26:74. The most preferred weight ratio for citric acid to malic acid is about 26:74. These acids can be present as acids or else as their respective anionic salts, i.e., citrate and malate.

It is important to this invention that the calcium be completely neutralized by the citric and malic acids and that the acid be in excess. Each mole of calcium has a plus 2 charge. Each citric acid has 3 carboxyl groups that are neutralized by the calcium and each malic acid has 2 carboxyl groups. Thus each mole of calcium ion neutralizes one malic acid or two-thirds of a mole of citric acid. The product herein must have an excess of citric and malic acids. Preferably, there is 50% more citrate and malate anions than calcium. In general, it has been found that a weight ratio of acids to calcium of from about 3.5 to about 6.5, preferably from about 4 to about 6, accomplishes this result.

Another way to express this numerically is by the following equation: $2x < 3y + 2z$ wherein $x$=moles of calcium, $y$=moles of citric and $z$=moles of malic acid.

For the purposes of the present invention, the level of the acid component (hereafter total acids) depends on the beverage composition involved, the level of calcium included (as previously discussed), as well as the mouthfeel, taste and stability properties desired.

For the beverage concentrates of the present invention, the level of total acids can range from about 0.7% to about 8.25%, and preferably from about 1% to about 6%. The most preferred level of total acids is from about 3% to about 4%.

Acidic Anion Component: Chloride, Nitrate and Sulfate

An important component for the beverage concentrates of the present invention is the level of acidic anions present, specifically chloride ion, nitrate ion and sulfate ion. The beverage concentrates of the present invention can comprise from about 0.05% to about 1.2% chloride anion, nitrate anion, sulfate anion and mixtures thereof. Preferably, the level of chloride anion, nitrate anion, sulfate anion and mixtures thereof is in the range of from about 0.15% to about 1.0%. More preferably, the level is from about 0.2% to about 0.5%. These ranges are based on the weight of the anion and not on the salt. That is, the weight of the cation is ignored.

The chloride, nitrate and sulfate anions are preferably obtained from their corresponding acid forms, i.e., hydrochloric acid and nitric acid, or from their corresponding calcium salts such as calcium nitrate, calcium sulfate or calcium chloride.

Separately, calcium salts soluble in acidic media and which form strong acids ($pK_a < 3.1$) in solution can be used in combination with hydrochloric acid or nitric acid. These calcium salts include calcium phosphate tribasic, calcium pyrophosphate and calcium tartrate and can provide from 1% to 25% of the solubilized calcium (i.e., at levels of 0.002% to 0.24% calcium by weight). The free acid forms of these salts, i.e., orthophosphoric, pyrophosphoric, or tartaric acids can also be used in combination with hydrochloric acid, nitric acid, calcium chloride or calcium nitrate to lower the pH of the concentrate and allow more calcium to be dissolved (from about 0.2% to about 1.20%). Other cations such as sodium, potassium, magnesium, zinc can be used herein.

It should be noted that chloride anion has been found to be corrosive to stainless steel processing equipment. For this reason, mixtures of chloride anion with other suitable anions, such as nitrate and sulfate, are preferred. Due to the poor solubility of sulfate, mixtures of sulfate anions with other suitable anions is required.

Preferably, the chloride anion is derived from calcium chloride, which can provide from about 1% to about 25% solubilized calcium. More preferably, calcium chloride provides from about 10% to about 20% solubilized calcium. Calcium chloride, calcium nitrate and calcium sulfate combined can supply from about 1% to about 25% of the solubilized calcium for concentrates. Preferably, calcium chloride, calcium nitrate and calcium sulfate combined supply from about 10% to about 20% of the solubilized calcium present in concentrates. Preferably, the remaining calcium, in the range of 80% to 90%, comes from calcium carbonate or calcium hydroxide. These sources have the advantage of being neutralized by the acids and thus contribute no anion off-flavor.

The use of chloride, nitrate and sulfate anions in the beverage concentrates of the present invention contributes to the stability at high temperatures when using high levels of solubilized calcium, i.e., milk level. This is especially true when they are used in combinations with a high fructose corn syrup.

It also has been discovered that greater than 5-fold beverage concentrates are stable from calcium precipitation at temperatures of greater than 90° F. (32° C.) for at least about thirty (30) days while providing consumer acceptable taste and mouthfeel, when fructose is the sweetener. Preferably liquid fructose is used. Such concentrates comprise:

(1) from about 0.2% to about 1.2%, preferably from about 0.4% to about 1.0%, solubilized calcium;
(2) from about 0.7% to about 8.25% of an acid component comprising a mixture of citric acid and malic acid wherein said mixture has a weight ratio of citric acid to malic acid of from about 20:80 to about 26:74, preferably at about 26:74;
(3) an effective amount of a flavor component;
(4) at least about 40% sugar comprising about 40% to about 95%, by weight of the concentrate, fructose; and
(5) from about 5% to about 60% water.

Preferably, the level of fructose ranges from about 45% to about 85%, more preferably from about 50% to about 65%. More preferably, the fructose source is in the form of fructose syrup, liquid fructose, dry fructose, high fructose corn syrup comprising at least 50% fructose solids, preferably about 55% fructose solids. A most preferred fructose source is liquid fructose available from A. E. Staley Manufacturing, Decatur, Ill. Although, these beverage concentrates provide for good stability at greater than 90° F. (32° C.), without the use of the acid anions, e.g., chloride, the level of solubilized calcium is reduced and typically, only half of milk level calcium can be achieved.

Flavor Component

The particular amount of the flavor component effective for imparting flavor characteristics to the beverage concentrates can depend upon the flavor(s) selected, the flavor impression desired and the form of the flavor component. The flavor component of the present invention is preferably selected from the group consisting of fruit flavors, botanical flavors, fruit juices, botanical juices and mixtures thereof. The flavor component usually comprises from about 0.001% to about 70% of the beverage concentrates of the present invention. When single strength fruit juice is the flavorant, the flavorant is from about 1% to about 70%, preferably from about 5% to about 30%, of the beverage concentrate. The water in the single strength fruit juice is to be included in the water of the beverage concentrate. Juices also provide sugars (about 10% for single strength juices to about 80% for fruit concentrates). These sugars are accounted for in the sugar level. The amount of juice used as the flavorant depends on its concentration and is easily determined by one skilled in the art.

The term "fruit flavors" refers to those flavors derived from the edible reproductive part of a seed plant, especially one having a sweet pulp associated with the seed. Also included within the term "fruit flavor" are synthetically prepared flavors made to simulate fruit flavors derived from natural sources. Particularly preferred fruit flavors are the citrus flavors including orange flavors, lemon flavors, lime flavors and grapefruit flavors. Besides citrus flavors, a variety of other fruit flavors can be used such as apple flavors, grape flavors, cherry flavors, pineapple flavors and the like. These fruit flavors can be derived from natural sources such as fruit juices and flavor oils, or else synthetically prepared.

The term "botanical flavor(s)" refers to flavors derived from parts of a plant other than the fruit; i.e., derived from bean, nuts, bark, roots and leaves. Also included within the term "botanical flavor" are synthetically prepared flavors made to simulate botanical flavors derived from natural sources. Examples of such flavors include cocoa, chocolate, vanilla, coffee, cola, tea and the like. Botanical flavors can be derived from natural sources such as essential oils and extracts, or can be synthetically prepared.

The term "fruit juice(s)" refers to citrus juices, noncitrus juices such as apple juice, grape juice, pear juice, nectarine juice, currant juice, raspberry juice, gooseberry juice, blackberry juice, blueberry juice, strawberry juice, custard-apple juice, cocoa juice, pomegranate juice, guava juice, kiwi juice, mango juice, papaya juice, watermelon juice, cantaloupe juice, cherry juice, cranberry juice, pineapple juice, peach juice, apricot juice, plum juice, prune juice, passion fruit juice, tamarindo juice, banana juice and mixtures of these juices. Preferred fruit juices are the citrus juices. The term "citrus juices" refers to fruit juices selected from orange juice, lemon juice, lime juice, grapefruit juice, tangerine juice and mixtures. The most preferred fruit juices for use are apple juice, pear juice, grape juice, passion fruit juice, peach juice, apricot juice, papaya juice and mixtures thereof.

In addition to fruit juices any botanical juice may be used as all or part of the flavor component of the present invention. The term "botanical juice(s)" refers to juices derived from parts of a plant other than the fruit, e.g., derived from stems, beans, nuts, bark, roots and leaves. Botanical juices particularly suitable for making the beverage concentrates of the present invention include tomato juice, lettuce juice, celery juice, spinach juice, cabbage juice, watercress juice, dandelion juice, rhubarb juice, carrot juice, beet juice and cucumber juice.

For use in the flavor component of the present invention, the fruit and botanical juices are typically and preferably concentrated by conventional means. Fruit juices are typically concentrated from about 20° Brix to about 80° Brix.

The juices can be concentrated by evaporation. Conventional evaporators of the ascending or descending film type, evaporators combining the ascending and descending film feature, multiple tube evaporators, plate type evaporators, expanding flow evaporators and centrifuged evaporators can be used and are preferred.

Other means of concentrating juice can be used. These would include reverse osmosis, sublimation concentration, freeze drying or freeze concentration. Economically, however, it is preferred to use an evaporation technique.

Sugar

The term "sugar" includes all carbohydrates or sugars, for example, mono and disaccharides, such as glucose, sucrose, maltose and fructose, sugar alcohols, low molecular weight dextrins and related carbohydrates. "Sugar" also includes liquid fructose, high fructose corn syrup solids, invert sugar, maltose syrup, corn syrup and sugar alcohols, including sorbitol and mixtures thereof. Artificial or high intensity sweeteners are not encompassed by the term sugar, but they may be present in the composition as a means of enhancing the beverage taste or flavor.

The level of sugar on a dry weight basis used in the present invention ranges from about 35% to about 80%, preferably from about 40% to about 75%, and most preferably from about 45% to about 70%. Preferred sugars for use in the present invention are fructose, glucose, maltose, sucrose, invert sugar and mixtures thereof. Generally, fructose is used in the from of liquid fructose, high fructose corn syrup, dry fructose or fructose syrup. Preferably, the high fructose corn syrup (on a solids basis) comprises at least about 50% fructose and more preferably greater than 55% fructose (on a solids basis). Preferred fructose sources are high fructose corn syrups containing 55% fructose solids and liquid fructose (99% fructose solids) both of which are available from A. E. Staley Manufacturing, Decatur, Ill.

Typically, the sugar for use in the present compositions is a monosaccharide or a disaccharide. These include sucrose, fructose, dextrose, maltose and lactose, but other carbohydrates can be used if less sweetness is desired. Mixtures of sugars can be used also.

Preferred sugars for use are sucrose and fructose. It should be noted that sugars, especially high fructose corn syrup, have been found to enhance the absorbability/bioavailability of calcium from beverages made from the beverage concentrates of the present invention.

Other natural or artificial sweeteners can be used. Artificial sweeteners include saccharin, cyclamates, acetosulfam, L-aspartyl-L-phenylalanine lower alkyl ester sweeteners (e.g., aspartame), L-aspartyl-D-alanine amides disclosed in U.S. Pat. No. 4,411,925 to Brennan et al., issued Oct. 23, 1983, L-aspartyl-D-serine amides disclosed in U.S. Pat. No. 4,399,163 at Brennan et al., issued Aug. 16, 1983, L-aspartyl-L-l-hydroxymethyl-alkaneamide sweeteners disclosed in U.S. Pat. No. 4,338,346 to Brand, issued Dec. 21, 1982, L-aspartyl-l-hydroxyethyl-alkaneamide sweeteners disclosed in U.S. Pat. No. 4,423,029 to Rizzi, issued Dec. 27, 1983, L-aspartyl-D-phenylglycine ester and amide sweeteners disclosed in European Patent Application 168,112 to J. M. Janusz, published Jan. 15, 1986, and the like.

Because of the acidity of the beverage concentrate systems of the present invention and due to temperatures above about 90° F. (32° C.), L-aspartyl-L-phenylalanine lower alkyl ester sweeteners, such as aspartame, may degrade and therefore are not preferred for use in the present compositions.

The amount of the sweetener effective in the beverage concentrates and food compositions of the present invention depends upon the particular sweetener used and the sweetness intensity desired. For mixtures of noncaloric sweeteners and sugars, the amount of noncaloric sweetener varies depending upon the sweetness intensity of the particular sweetener (from about 0.5% to 2%). In determining the amount (dry weight basis) of sugar, any sugar or other sweetener present in the flavor component, typically from the use of juices, is also included. Low-calorie sweetener combinations containing a noncaloric sweetener such as aspartame and a sugar, such as corn syrup solids, or sugar alcohols can also be used in beverage mixes, however, they are not preferred due to the stability problems of the artificial sweeteners at the pH of the concentrates.

Concentration

The beverage concentrates of the present invention are greater than 5-fold beverage concentrates. Typically, the concentration is greater than 5.1 fold and preferably greater than 5.5 fold. Most preferably, the concentration is about 5.75 or greater. Generally, the concentration will range from about 5.5-fold to about 10-fold.

At these high concentrations, the amount of water present will range from about 20% to about 65%, preferably from about 25% to about 60%. More preferably, the water present is in the range of from about 30% to about 55% of the beverage concentrates.

Water includes all the water in the flavor, sugar and other liquid components.

pH

The beverage concentrates have a pH of less than or equal to about 4.5. Preferably, the pH is less than or equal to about 3.5 and more preferably less than or equal to about 3.3. Typically, the pH for the beverage concentrates will range from about 2.5 to about 4.5.

Optional Ingredients

Both the amount of water and the pH provide microbial and fungal stability to the product, due to the low water activity. The beverage concentrates of the present invention may comprise any other ingredient or ingredients typically used as optional ingredients. Other minor beverage ingredients are frequently included. Such ingredients include preservatives such as benzoic acid and salts thereof, sulphur dioxide, etc. Also, typically included are colors derived either from natural sources or synthetically prepared. See L. F. Green, *Developments in Soft Drinks Technology*, Vol. 1 (Applied Science Publishers Ltd. 1978), pp. 185–186 (herein incorporated by reference) for preservatives and colors used in beverages.

Gums, emulsifiers and oils can be included to change the texture and opacity of the beverage. Typical ingredients include guar gum, xanthan, alginates, mono and diglycerides, lecithin, pectin, pulp, cottonseed oil, vegetable oil and weighing oils. Esters and other flavor and essence oils can also be used.

Uses

The present beverage concentrates can, in addition to making single strength carbonated and non-carbonated beverages, be used as a sweetener and/or flavorant in food compositions.

Food compositions of the present invention can contain from about 1% to about 99% of the beverage concentrates. Preferred embodiments of these food compositions include baked goods, fruit drinks/mixes, frozen foods, candies, carbonated beverages, milk drinks/mixes, gelatins, puddings, fillings, breakfast cereals, breakfast bars, sauces, jams, jellies, whipped toppings, tablets, syrups, orally administered medicines, spreads, chewing gums and chocolates. The most preferred food compositions are confectionary products such as candy bars and gums.

The beverage concentrates of the present invention can be substituted for all or part of the sugars in a food composition. Just as adjustments are made in recipes and formulations for the different properties of sucrose and fructose or dextrose, adjustments for the different properties of these sugar derivatives must be made. These changes are within the skill of one in the art.

The following is by way of example a partial list of food compositions which can be made with these sugar derivatives: cakes, cookies, brownies, other sweet snacks, icings, frostings, pie fillings, puddings, creams, hard and soft candies, chocolates, crackers, snacks made from potatoes, corn, wheat and other grains, sauces, gravies, yogurt, ice cream, jellies, jams, breadings, breads, rolls, muffins, doughnuts and sweet rolls.

Method of Preparation

In order to achieve the stability of the concentrates, the materials must be added in a particular sequence. The sugars and calcium salts are solubilized and they compete for the water to remain in solution. To make a concentrated solution which is free from solids, all solids have to be dissolved in water either as a premix or during the addition step.

Several premixes or solutions are formed. First the sugars are dissolved in water. For convenience, liquid sugars or syrups are used. A preferred sugar source is liquid fructose, invert syrup and high fructose corn syrup. Generally these syrups have about 50% to 99% sugar solids.

The citric and malic acids are also dissolved in water. The preservatives and optional ingredients, i.e. thickeners, gums, alginates, pectins, emulsifiers form a third solution.

The calcium source is prepared as a slurry. The calcium chloride, nitrate, sulfate, phosphates are first dissolved in water. The remaining calcium is then added to make a slurry. Preferably this remaining calcium is calcium hydroxide, calcium oxide or calcium carbonate. The calcium hydroxide and calcium carbonate react with the organic acids so the calcium is solubilized in the processing step. While not wishing to be bound by theory, it is believed that a metastable calcium citrate malate complex is formed which remains in solution in the concentrate. When processed in the manner described herein, the calcium is more soluble than the corresponding salts, i.e. calcium citrate and calcium malate.

The flavor component is a separate mix. If the flavor component contains citric or malic acids, as for example, a fruit juice or fruit juice concentrate would, the ratio of the citric to malic acid must be adjusted to be the same as in the citric and malic acid premix. Additional citric or malic acid is added if necessary to achieve this ratio. Otherwise, calcium citrate or calcium malate can form during the processing step and precipitate. Once precipitated, it is difficult to redissolve in the limited water available.

The mixing sequence is as follows:

The sugars and the acid solution are mixed with agitation to make a uniform mixture. The addition sequence is not critical. The acids can be dissolved in the mix tank with water and the sugar pumped in, or the sugar solution can be put into the tank and the acid solution pumped in.

To this mixture is added the calcium slurry. The addition is controlled so that the reaction mixture does not become too hot. The temperature should not exceed 120° F. (49° C.). The calcium is neutralized by the citric and malic acids during this addition. The temperature rises due to the heat of neutralization. When calcium carbonate is used, the neutralization produces carbon dioxide which can cause foaming. This can be controlled by the rate of addition of the calcium.

The flavor is then added to the calcium, citric and malic acid sugar mixture. Any preservatives, gums, emulsifiers, vitamins, minerals vegetable oils, weighting oils, or other optional ingredients are added at this stage. These materials are added as a water solution or as liquids.

The concentrate is shelf-stable due to its low water activity. However, it can be pasteurized with a short time, high temperature treatment or otherwise sterilized as is conventional for products of this type.

Basically, this is a process for preparing a shelf-stable calcium fortified beverage concentrate, comprising:

(1) preparing a mixture of a sugar solution and citric and malic acid in water;

(2) adding a slurry of calcium salts in water, wherein any calcium citrate, calcium malate and inorganic calcium salt is first dissolved in water and then other calcium salts are added to make the slurry, said slurry being added with agitation and wherein the temperature is maintained below 120° F. (49° C.);

(3) adding to the mixture of (2) the flavors dissolved in water, wherein the citric and malic acid present in the flavor is in the same ratio as the acids in (1); and (4) adding to the mixture of (3) any preservatives and optional ingredients in water.

The preferred method of preparation for the beverage concentrates of the present invention is as follows:

A beverage base (concentrated 50-fold to 200-fold) is first prepared by first making a flavor concentrate. Fruit concentrates and purees are blended together in the appropriate amounts to result in the desired finished beverage flavor and strength. They are mixed well and analyzed for citric and malic acid content in order to provide for the desired finished beverage acidity. Other natural and artificial flavor components may also be added. Minor ingredients (including antifoam, pectin, preservatives, colorants and opacifiers) are added, and the final acidity of the base is adjusted to provide a target pH. The base may be homogenized to provide a stable emulsion for shipment and storage.

A separate mixture of sugar and the organic acids and calcium is made.

Liquid sweetener ( 60 to 77% solids) is added to the mix tank. A separate premix of citric and malic acids dissolved in water is prepared, and then blended into the sweetener. A second premix of the calcium salts, dissolved or slurried in water, is prepared and then introduced into the mix tank with the organic acids and sweeteners good agitation. The calcium salts, preferably calcium hydroxide or calcium carbonate, react with the acids in the presence of the sugar solids to form a stable calcium-citrate-malate complex, at the same time evolving heat of neutralization and carbon dioxide if calcium carbonate is used. After the mixture becomes transparent with no solid particles observed, the concentrated flavor base, flavor component, is added. Finally, any preservative and any other fortification (Vitamin C) are added. Additional vitamins and minerals can also be added.

The concentrate can be analyzed for solids content and acidity. The solids content is the amount of sugar and other dissolved solids present. If necessary additional sugar can be added. The pH is adjusted by adding the acidic anion. The concentrate can be either pasteurized and hot packed or chilled and cold packed for storage and distribution to customers.

Finally, the customer dilutes the syrup with water to the desired finished beverage strength.

An improved method of preparing beverage syrups/beverage concentrates is to use a batch process wherein a first premix, a calcium fortified sugar syrup, and a second premix, a beverage flavor base, which are independently stable from calcium precipitation and sugar crystallization at high temperatures for at least about 4 hours, preferably at least about 3 days are prepared and combined. These premixes can be combined immediately or combined at a later time. When combined they form a beverage premix concentrate which only requires the addition of an appropriate amount of water and sweetener for dilution to a beverage syrup or single strength beverage.

The first premix being a calcium fortified sugar syrup with a bioavailable source of calcium which is storage stable for at least about 4 hours, preferable at least about 7 days and most preferably at least about 21 days at temperatures of at least about 85° F. (29° C.), and is a clear pumpable solution.

Premix 1: Calcium Fortified Sugar Syrup
The calcium fortified sugar syrup is made from:
1. Water;
2. Citric Acid;
3. Malic Acid;
4. Sugar, preferably Liquid Fructose, High Fructose Corn Syrup and mixtures thereof;
5. Calcium Source, e.g. $CaCO_3$; and
6. Optionally on Acidic Anion Source, e.g. $CaCl_2$.

Stability from calcium precipitation and sugar crystallization over time and at high temperatures allows premix 1, calcium fortified sugar syrup compositions, to be stored for periods of time without refrigeration, dilution or freezing.

These compositions are stable from calcium precipitation and sugar crystallization for at least about four (4) hours at temperatures of at least about 85° F. (29° C.) and typically from about 3 days to about 130 days, preferably from about 45 days to about 100 days, at temperatures of at least about 85° F. (29° C.). Preferably, these compositions are stable for at least about five (5) days at about 85° F. (29° C.).

Calcium fortified sugar syrup compositions of the present invention comprise:
a) from about 0.6% to about 7%, by weight, soluble calcium;
b) from about 2% to about 47%, by weight, of an edible acid component comprising a mixture of citric acid and malic acid wherein the ratio of citric and malic equivalents to calcium equivalents is from about 1.5:1 to about 2:1, preferably from about 1.5:1 to about 1.8:1, and the ratio of citric equivalents to malic equivalents is from about 3:97 to about 93:7, preferably from about 10:90 to about 50:50 and more preferably about 20:80;
c) from about 5% to about 80%, preferably from about 5% to about 75% and more preferably from about 25% to about 55%, on a dry weight basis, sugar, wherein preferably at least about 15% of said sugar is fructose and the weight ratio of water to fructose is preferably from about 5:1 to about 1:3, more preferably from about 2:1 to about 1:2 and most preferably about 1:1 to about 1:2; and
d) from about 5% to about 92% preferably from about 20% to about 70% and more preferably from about 23% to about 60%, by weight, water.

These compositions are stable from calcium precipitation for at least about four (4) hours to at least about 3 days at temperatures of at least about 85° F. (29° C.).

Preferred calcium fortified sugar syrup compositions which are stable from calcium precipitation and sugar crystallization for at least about three (3) days at temperatures of at least about 85° F. (29° C.) comprising:
a) from about 0.6% to about 2.5%, preferably from about 1.2% to about 2.4%, by weight, soluble calcium;
b) from about 2% to about 17%, preferably from about 4% to about 14%, by weight, of an edible acid component comprising a mixture of citric acid and malic acid wherein the ratio of citric and malic equivalents to calcium equivalents is from about 1.5:1 to about 2:1, preferably from 1.5:1 to about 1.8:1, and the ratio of citric equivalents to malic equivalents is from about 3:97 to about 93:7, preferably from about 10:90 to about 50:50 and more preferably about 20:80;
c) from about 5% to about 75% preferably from about 35% to about 70% and more preferably from about 30% to about 45%, on a dry weight basis, sugar wherein said sugar comprises at least about 5%, preferably at least about 15% and more preferably at least about 40%, fructose, on a dry weight basis; and
d) from about 5% to about 92%, preferably from about 11% to about 70% and more preferably from about 30% to about 60%, by weight, water.

These compositions are stable from calcium precipitation and sugar crystallization for at least about four (4) hours at temperatures of at least about 85° F. (29° C.) and typically from about 3 days to about 130 days, preferably from about 45 days to about 100 days, at temperatures of at least about 85° F. (29° C.). From about 3% to about 30% of the soluble calcium can be sourced from an acidic calcium salt. The compositions preferably can further comprise from about 0.05% to about 5%, preferably from about 0.2% to about 3%, of an acidic anion which typically improves stability by a factor of two. Another means of improving stability to at least about seven (7) days is for preferably at least about 15% and more preferably at least about 40% of the sugar to be fructose such that the weight ratio of water to fructose is from about 5:1 to about 1:3, preferably from about 2:1 to about 1:2 and most preferably from about 1:1 to about 1:2.

Further, the present invention relates to the preparation of calcium fortified sugar syrup compositions which are stable from calcium precipitation and sugar crystallization for at least about 3 days, at temperatures of at least about 85° F. (29° C.) comprising:
a) from about 2.5% to about 7%, preferably from about 2.5% to about 5%, by weight, soluble calcium;
b) from about 10% to about 47%, by weight, of an edible acid component comprising a mixture of citric acid and malic acid wherein the ratio of citric and malic equivalents to calcium equivalents is from about 1.5:1 to about 2:1, preferably from about 1.5:1 to 1.8:1, and the ratio of citric equivalents to malic equivalents is from about 3:97 to about 93:7, preferably from about 10:90 to about 50:50 and more preferably about 20:80;
c) from about 10% to about 70%, preferably from about 25% to about 60% and more preferably from 30% to about 50%, on a dry weight basis, sugar wherein said sugar comprises at least about 15%, preferably at least about 40%, fructose, on a dry weight basis; and
d) from about 20% to about 60%, preferably from about 25% to about 60%, by weight, water wherein the weight ratio of water to fructose ranges from about 5:1 to about 1:2, preferably from about 2:1 to about 1:2 and most preferably from about 1:1 to about 1:2.

These compositions are stable from calcium precipitation and sugar crystallization for at least about four (4) hours at temperatures of at least about 85° F. (29° C.) and typically from about 3 days to about 130 days, preferably from about 45 days to about 100 days, at temperatures of at least about 85° F. (29° C.). Preferably, these compositions are stable for at least about five (5) days at about 85° F. (29° C.).

From about 3% to about 30% of the soluble calcium can be sourced from an acidic calcium salt. The compositions preferably can further comprise from about 0.05% to about 5%, preferably from about 0.2% to about 4%, of an acidic anion which typically improves stability by a factor of two. The acidic anion is preferably selected from the group consisting of chloride anion, sulfate anion, nitrate anion and mixtures thereof.

Method of Preparation of Premix 1

The calcium salts react with the organic acids so the calcium is solubilized in the processing step. While not wishing to be bound by theory, it is believed that a metastable calcium citrate malate complex is formed. The calcium salts, e.g., calcium carbonate, along with the citric and malic acids remain in solution in the sweetener supplement compositions. When processed in the manner described herein, the calcium citrate malate is more soluble than the corresponding salts, i.e. calcium citrate and calcium malate.

In order to achieve the maximum stability benefit, the materials should be added in a particular sequence. When sugars and calcium salts are solubilized, they compete for water to remain in solution. To make a concentrated solution which is free from precipitates, all solids should be dissolved or slurried in liquid media, preferably in water or liquid fructose, either as a premix or during the addition step.

Several premixes or solutions are formed. The sugars are dissolved in water if a crystalline or solid form of sugar is being used. For ease of preparation, liquid sugars or syrups are most preferred for use. Preferred sugar sources are liquid fructose, invert syrup and high fructose corn syrup.

The citric and malic acids are also dissolved in water. Once the acids are dissolved, the acidic anion source or acidic calcium salts if utilized, e.g., calcium chloride, is then added with agitation until dissolved into the solution containing the citric and malic acids. The addition of an acidic anion source, e.g., calcium chloride, has two advantages, one being the pH of the solution is reduced making calcium solubility more favorable and the other being that greater stability from calcium salt precipitation at high temperatures is obtained. If used the preservatives and optional ingredients, i.e. thickeners, gums, alginates, pectins, emulsifiers are dissolved or slurried in liquid media to form a premix.

The sugar is then added to the acids in solution.

It is desirable that the calcium source be prepared as a slurry, however, it is not necessary. Thus the calcium source(s), e.g., calcium carbonate, is dispersed in water, liquid fructose, high fructose corn syrup or other sugar syrup. (Calcium hydroxide, as the single calcium source, is not preferred for use in only liquid fructose or high fructose corn syrup slurries.) If utilized, the acidic calcium salts or acidic anion source, can be first dissolved in water by adding slowly with agitation; however, it is preferred that they be part of the citric and malic acids solution. The remaining calcium sources can then be slurried with water. Adequate agitation must be used to keep the slurry in suspension particularly when using calcium hydroxide which tends to form a paste in corners and dead spots.

To improve the stability of the calcium malate and especially the calcium citrate species, it is preferred to adjust the water to fructose (on a dry weight basis) weight ratio to range from about 1:1 to about 1:2. The addition of fructose reduces the water available for the formation of the insoluble calcium salts such as $Ca_3Cit_2.4H_2O$. Without added fructose, the compositions are typically stable for at least about one week, after which the more insoluble $Ca_3Cit_2.4H_2O$ is formed. Hence for stability for greater than about one week a weight ratio of water to fructose (on a dry weight basis) of from about 2:1 to about 1:2 is preferred. Stability can be improved by adjusting the weight ratio of citric acid to malic acid in premix 1 or premix 2 such that they are equivalent before addition. Preferably, the weight ratio of citric acid to malic acid will range from about 20:80 to about 80:20 and more preferably about 26:74. In addition, stability can be improved by adjusting the weight ratio of sugars (on a dry weight basis) to water in premix 1 or premix 2 such that they are equivalent before addition. Preferably, the weight ratio of sugars (on a dry weight basis) to water will range from about 1:5 to about 3:1, preferably from about 1:1 to about 2:1, more preferably from about 1.5:1 to about 2:1 and most preferably about 2:1.

One preferred mixing sequence is as follows:

The sugars and the acid solution are mixed with agitation to produce a uniform mixture. The addition sequence is not critical. The acids can be dissolved in the mix tank with water and the sugar solution pumped in, or the sugar solution can be put into the tank and the acid solution pumped in.

To this mixture is added the calcium slurry or dry calcium source. The addition is controlled so that the reaction mixture does not become too hot. The temperature should not exceed 120° F. (49° C.). Methods of keeping the temperature below 120° F. (49° C.) include using jacket cooling or recirculating the batch through a heat exchanger. The calcium source is neutralized by the citric and malic acids during this addition and excess acid is present. The temperature rises due to the heat of neutralization. When calcium carbonate is used, the neutralization produces carbon dioxide which can cause foaming. This can be controlled by the rate of addition of calcium carbonate.

Any preservatives, gums, emulsifiers, vitamins, minerals vegetable oils, weighting oils, or other similar optional ingredients can be added at this stage or to premix 2. These materials are added as a water solution or as liquids.

Another preferred mixing sequence is as follows:

The water and 30% of a High Fructose Corn Syrup (HFCS) is heated to 100° F. (38° C.). The acids are added to the solution and mixed with agitation until dissolved. High shear mixing, milling or dispersators can be used to provide sufficient mixing in low water systems. When an acidic calcium salt or calcium lactate is used, it is also dissolved in this solution.

The dry calcium source is dispersed in the remaining HFCS. When using calcium carbonate, the addition is controlled so that foaming caused by the neutralization product, carbon dioxide, is controlled. When calcium hydroxide is used, the neutralization process is an exothermic reaction. The addition is controlled so that the reaction mixture does not exceed 120° F. (49° C.).

Method of Preparation of Low Water Systems When Using High Fructose Corn Syrup or Liquid Fructose.

When preparing samples with a very low water content, less than or equal to about 20%, it is necessary to use as much as 70% of the Liquid Fructose, and/or high fructose corn syrup (HFCS). This will provide the water necessary to dissolve the acids. The water and 70% of the Liquid Fructose and/or High Fructose Corn Syrup, is heated to 100° F. (38° C.). The acids are added to the solution and mixed with agitation until dissolved. Dissolving the acids in water is endothermic causing the temperature to drop. Thus, additional heat may be needed to dissolve the acids. Continued heating may be necessary to dissolve the acids. Care is taken so that the temperature does not exceed 120° F. ( 49° C.). When acidic calcium salts, e.g. calcium chloride are used, they are also dissolved in this solution.

The dry calcium source is dispersed in the remaining sugar syrup. Calcium hydroxide is not preferred for use as the sole calcium source in this method. It tends to react with the high fructose corn syrup to form a solid mass. The addition is controlled so that foaming caused by the neutralization product, carbon dioxide, is controlled. At this point the composition is very viscous. Continued heating may be necessary. The addition is controlled so that reaction does not exceed 120° F. ( 49° C.).

Methods of Preparation of Low Water Systems When Using Fructose or Crystalline Sugars.

When preparing samples very low in water content, less than or equal to about 20%, it is necessary to use heat. The water is heated to 100° F. (38° C.). The acids are added to the solution and mixed with agitation until dissolved. The sugar is then added. Continued heating may be necessary to dissolve the sugars. Care is taken so that temperature does not exceed 120° F. ( 49° C.). When calcium chloride is used, it is also dissolved in this solution.

To this mixture is added the dry calcium source. The addition is controlled so that foaming caused by the neutralization product, carbon dioxide is controlled. At this point the syrup is very viscous. Continued heating may be necessary. When calcium hydroxide is used, the neutralization process is an exothermic reaction therefore the amount of heating used can be reduced. The addition is controlled so that reaction mixture does not exceed 120° F.

The sweetener supplement compositions are generally shelf-stable due to their low water activity. However, the compositions can be pasteurized with a short time, high temperature treatment or otherwise sterilized as is conventional for products of this type.

Premix 2: Beverage Flavor Base and Method of Preparation

The beverage flavor base compositions have a concentration of greater than about 50-fold to about 100-fold. The pH for the beverage flavor base compositions is less than or equal to about 3.5.

The beverage flavor base compositions of the present invention generally have a concentration of from about 10-fold to about 500-fold, preferably 50-fold to about 100-fold, and preferably comprise:
  (a) an effective amount of a flavor component;
  (b) from about 3% to about 25% of an acid component comprising of a mixture of citric and malic acid wherein the weight ratio of citric acid to malic acid is from about 20:80 to about 35:65;
  (c) from about 8% to about 50% sucrose; and
  (d) from about 20% to about 40% water;

wherein said flavor base preferably provides from about 3% to about 12% juice by volume when diluted to a single strength beverage. These beverage flavor base compositions, when combined with a calcium fortified sweetener containing about 1.5% to about 7% soluble calcium form beverage premix concentrates that are stable from calcium precipitation at temperatures of at least about 90° F. (32° C.) for at least about 3 days.

The more preferred beverage flavor base compositions of the present invention have a concentration of greater than 50-fold typically from about 50 fold to about 70 fold, and comprise;
  (a) an effective amount of flavor component;
  (b) from about 3% to about 10.5%, by weight, of an acid component comprising a mixture of citric acid and malic acid wherein the weight ratio of citric acid to malic is from about 20:80 to about 30:70;
  (c) from about 8% to about 50%, on a dry weight basis, sucrose;
  (d) from about 20% to about 40% water, wherein said beverage flavor base provides from about 3% to about 12% preferably from about 8% to about 12%, juice by volume when diluted to a single strength beverage. These more preferred beverage flavor base compositions when combined with a calcium fortified sweetener containing from about 2.5% to about 3.5% soluble calcium form beverage premix concentrates that are stable from calcium precipitation at temperatures of at least about 90° F. (32° C.) for at least about 7 days, preferably at least about 28 days.

The beverage flavor base is made from:
1. Flavor component;
2. Optional Ingredients: Gums/thickeners, colors, preservatives etc;
3. Dry, e.g., powdered, citric acid and malic acid; and
4. Water.

Preferably the optional ingredients, e.g., gums, colors and preservatives, are premixed and dissolved in liquid media, preferably water.

The flavor component is analyzed using standard methods in the art for the citric and malic acid content, sugar content and water content. The flavor component preferably comprises fruit and or botanical concentrates and/or purees such that when the beverage premix concentrates and syrups are diluted to a single strength beverage they contain from about 3 to about 12 %, more preferably from about 8% to about 12% juice by volume. For example, a 50× beverage premix concentrate composition, formulated to provide from about 8% to about 12% juice by volume on a single strength basis will be combined with from about 10% to about 14% sugar, and from 0% to about 2% optional ingredients to form a syrup to make the base which is then diluted with 6 parts water by volume to achieve a single strength beverage. Such a 50× beverage flavor base composition will comprise from about 70% to about 80%, by weight, fruit and/or botanical concentrates and/or purees. The premix solutions is pumped to a mix tank where fruit and/or botanical concentrates, purees, acids, sugar and flavors are added to form the flavor base concentrate. The solution is analyzed for citric and malic acid content, water content and sugar content. Adjustments are made if needed.

Preferably, in preparing the beverage flavor base one must determine the following things:

1. The amount of calcium wanted in the finished beverage premix concentrate. This determines the amount of acid that can be present in both the calcium fortified sugar syrup and flavor base.
2. The amount of solids wanted in the flavor base to obtain needed solids to water level in finished beverage premix concentrate.
3. The amount and ratio of citric and malic acid wanted in the flavor base to obtain needed solids to water level in finished beverage premix concentrate.
4. The final volume of flavor base wanted. (The amount must be fixed to determine ratio etc.)
5. The amount of citric and malic acid in the flavor component (juice concentrate, purees, etc.).

The desired solids (°Brix), weight % acid, and volume (gal) of the base is determined. A °Brix measurement is taken to determine the amount of solids present in the flavor component, e.g., purees, i.e. flavor, etc. The amount of solids needed is then determined.

Determine the weight of additional solids needed from sucrose tables which convert °Brix to pds/gal of sucrose.

Brix (solids) = (corresponding density from sucrose table)
Brix (solids) desired = (corresponding density from sucrose table)

The amount of solids to add is calculated by the following formulas:

Solids wanted = (volume of base desired) (density of existing °Brix) (% solid) — existing solid = (existing volume) (density of existing brix) (% existing solids)

The amount of citric and malic acid present in the flavor component is measured and their ratio determined. The total amount of desired acid is then multiplied by the respective weight ratios of citric:malic to determine how much of each acid is needed. The existing amounts are subtracted from the amount of citric and malic acids needed.

Acid wanted: (volume of base desired) (density of existing °Brix) (% acid) — existing acid = (existing volume) (density of existing °Brix) (% existing acid).

Determine the amount of sugar solids to be added by subtracting added acid solids from total solids to add. If fruit juice concentrate is used as the flavorant, this will determine the amount of concentrate needed.

Concentrate to add: the weight % of acid is subtracted from °Brix of concentrate to determine the existing sugar solids. therefore:

Brix of concentrate − weight % acid = sugar solids in concentrate.
Sugar solids needed/% existing sugar solids = Weight of concentrate to add.
Weight of concentrate to add/corresponding density at the concentrate's brix = gallons of concentrate to add.

After the above calculations are made, the volume of added acid is determined by the following equation, this determines the amount of water to add to the flavor base:

volume displaced by added acid = (Weight of acid to be added) (0.0728).

The amount of water to add is determined as follows:
Water to add = Desired volume − Current volume + volume of concentrate to add + volume of dry acid.

The amount of acid to add is calculated as follows:

When determining the weight % acid wanted in the final formula, one must also consider the acid coming from the calcium fortified sugar syrup. Therefore, the weight % acid in the flavor component is the total acid desired − the amount of acid contributed by the CCM syrup.

To make the beverage concentrates of the present invention the two premixes are added. The amount of each premix depends on 2 things. It depends how much calcium is contained in the calcium fortified sugar syrup and how much is desired in the finished beverage. Also, the amount of each one depends on the percent juice in the base and how much is desired for the finished beverage. The premixes are blended well. Preferably for stability from calcium salt precipitation over time and/or at high temperatures, and for stability from crystallization of sugars, the weight ratio of citric acid to malic acid in premix 1 is equivalent to the weight ratio of citric acid to malic in premix 2. Also for optional stability premix 1 comprises greater than about 50% excess acid equivalents from citric and malic acids and/or premix 1 and premix 2 have equivalent fructose to water and/or solids to water weight ratios. Further, it is preferred that the premixes be added together within approximately 3 days for preferred calcium stability in the beverage concentration.

However, premix 1 and premix 2 are stable from calcium precipitation over time and at high temperatures as well as stable from sugar crystallization over time and at high temperatures for at least about 4 hours, preferably at least about 3 days and most preferably for at least about 7 days. Whereas the most preferred compositions of premix 1 are stable from calcium salt precipitation over time and at high temperatures, as well as stable from sugar crystallization over time and at high temperatures, for at least about 28 days.

The completed premix beverage concentrates will require water and sugar for dilution to a beverage syrup or to a single strength beverage. The determination of the appropriate amount of water and sweetener, preferably sucrose and/or fructose, to be added is within the skill of one versed in the art. Further, although it is preferred for a 50× premix concentrate or flavor base, for example, to be diluted with sugar and water to form a syrup then diluted with about 6 parts water by volume, it is not required since the Brix i.e. sweetness, tartness of a single strength beverage is often dictated by consumer taste differences.

In summary, this is a process for preparing a shelf-stable beverage premix concentrate or beverage syrup, comprising the steps of:
1. preparing a calcium fortified sugar syrup, premix 1, by a process comprising the steps of:
    (1) preparing a solution of sugar and water,
    (2) preparing a solution of citric and malic acids by dissolving said acids in water;
    (3) combining the sugar solution of (1) with the citric and malic acids of (2) with agitation;
    (4) adding with agitation a slurry of calcium salts in water while maintaining the temperature below 120° F. until the neutralization reaction is complete and a clear solution is achieved; and
2. preparing a beverage flavor base, premix 2, comprising a flavor component, water, citric acid and malic acid;

wherein the weight ratio of citric and malic acid in premix 2 is in the same ratio as the citric and malic acids in premix 1 and the weight ratio of sugars to water in premix 2 is the same as in premix 1, and the weight ratio of sugars (on a dry weight basis) to water in premix 1 and premix 2 are preferably in the range of from about 1:5 to about 3:1 preferably from about 1:1 to about 2:1, more preferably from about 1.5:1 to about 2:1 and most preferably about 2:1; and

3. combining premix 1 and premix 2.

Instead of preparing a sugar solution from dry sugar, sugar syrups such as high fructose corn syrup and liquid fructose can be used. If an acidic onion source is used it can either be added and dissolved into the citric and malic acid solution of premix 1 or dissolved in water and then the calcium sources added to form the calcium slurry of premix 1. Optional components such as preservatives can be dissolved in water and added with agitation to premix 1, premix 2 or the combined composition.

While the following description is with reference to sugar containing beverages, beverages containing some noncaloric sweeteners can also be prepared by appropriate modification. See L. F. Green, *Developments in Soft Drinks Technology*, Vol. 1, (Applied Science Publishers Ltd. 1978), pp. 102–107 (herein incorporated by reference), for a further description of beverage making, in particular the process for carbonation. The amount of carbon dioxide added to a beverage concentrate depends upon the particular flavor system used and the amount of carbonation desired. Usually, carbonated beverages made from the present invention contain from 1.0 to 4.5 volumes of carbon dioxide. Preferred carbonated beverages contain from 2 to 3.5 volumes of carbon dioxide.

EXAMPLES

The following are specific embodiments of beverage concentrates and methods for making them. These examples are illustrative of the invention and are not intended to be limiting of it.

Example I

A 5.75 fold (5.75×) beverage concentrate of the present invention, being stable at 120° F. (49° C.) for at least about 7 days and at greater than 90° F. (32° C.) for 30 days, is prepared as follows:

| Ingredient | Amount (g) |
|---|---|
| Premix A | |
| Water | 5.23 |
| Calcium chloride | 0.43 |
| Calcium hydroxide | 0.87 |
| Premix B | |
| Water | 1.00 |
| Sodium benzoate | 0.13 |
| Fruit Premix | |
| Base premix - Flavorant, color (contains 0.013 g citric acid and 0.115 g malic acid from fruit) | 11.36 |
| Citric acid | 0.50 |
| Malic acid | 1.32 |
| Final Mix | |
| Water | 5.47 |
| Citric acid | 0.39 |
| Malic acid | 1.08 |
| Liquid Fructose[1] | 72.00 |
| Premix A | 6.53 |
| Fruit Premix | 13.18 |
| Premix B | 1.13 |
| Ascorbic acid | 0.22 |

| Ingredient | Amount (g) |
|---|---|
| Total | 100.00 |

[1]Liquid Fructose is 77% solids, 23% water, 99.5% of the solids are fructose. It is supplied by A. E. Staley Manufacturing Co., Decatur, IL.

The citric acid to malic acid ratio in the fruit premix and in the final mix is 0.36. The solubilized calcium level is about 0.6 gm.

The fruit premix is prepared by making a flavor concentrate by blending fruit concentrates and purees. It is homogenized with the acids to provide a stable emulsion for shipment and storage.

Liquid fructose (77% solids) is added to the mix tank. A separate premix of citric and malic acids dissolved in water is prepared, and then blended into the fructose. Premix A is prepared by first dissolving calcium chloride in water and then adding the calcium hydroxide. The slurry is added to the acid and fructose mixture with good agitation. The rate of addition is controlled so that the temperature does not rise more than about 10 degrees F. After the mixture becomes transparent with no solid particles observed, the concentrated fruit premix is added and then the ascorbic acid. Finally, the sodium benzoate is added.

Example II

A 10-fold beverage concentrate is prepared in a manner similar to Example I. It is stable at greater than 90° F. (32° C.) for at least 30 days.

| Ingredient | Weight % |
|---|---|
| Liquid Fructose[1] | 49.00 |
| Citric Acid, Anhyd. | .07 |
| Sodium Benzoate | .13 |
| Ascorbic Acid | .41 |
| Water | 28.38 |
| Malic Acid | .19 |
| Calcium Hydroxide | .54 |
| $CaCl_2 \cdot 2H_2O$ | .26 |
| Flavorant, Color and Misc. | 21.02 |
| | 100.00 |

[1]Liquid fructose as in Example I.

Example III

A 6-fold beverage concentrate, stable at greater than 90° F. (32° C.) for at least 30 days, is prepared in a manner similar to Example I.

| Ingredient | Weight % |
|---|---|
| Liquid Fructose | 74.80 |
| Citric Acid, Anhyd. | .62 |
| Sodium benzoate | .13 |
| Ascorbic Acid | .23 |
| Water | 9.41 |
| Malic Acid | 1.77 |
| Calcium Hydroxide | .90 |
| $CaCl_2 \cdot 2H_2O$ | .44 |
| Flavorant, Color & Misc. | 11.70 |
| | 100.00 |

Example IV

A 6.45-fold beverage concentrate, stable at greater than 90° F. (32° C.) for at least 30 days, is prepared as in a manner similar to Example I.

| Ingredient | Weight % |
| --- | --- |
| Liquid Fructose | 78.80 |
| Citric Acid, Anhyd. | .64 |
| Sodium benzoate | .13 |
| Ascorbic Acid | .24 |
| Water | 4.56 |
| Malic Acid | 1.83 |
| Calcium Hydroxide | .95 |
| $CaCl_2 \cdot 2H_2O$ | .47 |
| Flavorant, Color & Misc. | 12.38 |
| | 100.00 |

Example IV contains about 0.6% solubilized calcium and about 0.2% chloride anion.

Example V

A 5.75-fold beverage concentrate, stable at 90° F. (32° C.) for at least 30 days and at 120° F. (49° C.) for at least 7 days, is prepared in a manner similar to Example I.

| Ingredient | Weight % |
| --- | --- |
| Liquid Fructose | 72.00 |
| Citric Acid, Anhyd. | .59 |
| Sodium benzoate | .13 |
| Ascorbic Acid | .22 |
| Water | 12.75 |
| Malic Acid | 1.67 |
| Calcium Hydroxide | .87 |
| $CaCl_2 \cdot 2H_2O$ | .43 |
| Flavorant, Color & Misc. | 11.34 |
| | 100.00 |

Example V contains about 0.6% solubilized calcium and about 0.2% chloride anion.

Example VI

A 5.75-fold beverage concentrate, stable at about 90° F. (32° C.) for at least about 30 days and at about 120° F. (49° C.) for at least about 7 days, is prepared in a manner similar to Example I.

| Ingredient | Weight % |
| --- | --- |
| Liquid Fructose | 72.00 |
| Citric Acid, Anhyd. | .70 |
| Sodium benzoate | .13 |
| Ascorbic Acid | .22 |
| Water | 12.52 |
| Malic Acid | 2.00 |
| Calcium Hydroxide | 1.09 |
| Flavorant, Color & Misc. | 11.34 |
| | 100.00 |

Example VI contains about 0.6% solubilized calcium.

Example VII

A 5.75-fold beverage concentrate, stable at greater than 90° F. (32° C.) for at least about 30 days and at about 120° F. (49° C.) for at least about 7 days, is prepared in a manner similar to Example I.

| Ingredient | Weight % |
| --- | --- |
| HFCS-55 (77%) | 69.00 |
| Citric Acid, Anhyd. | .40 |
| Sodium benzoate | .13 |
| Ascorbic Acid | .23 |
| Water | 16.19 |
| Malic Acid | 1.96 |
| Calcium Hydroxide | .52 |

-continued

| Ingredient | Weight % |
| --- | --- |
| $CaCl_2 \cdot 2H_2O$ | .00 |
| Flavorant, Color & Misc. | 11.57 |
| | 100.00 |

Example VII contains about 0.3% solubilized calcium. High fructose corn syrup-55 is a 77% solids and 23% water solution available from A. E. Staley; 55% of the solids are fructose.

These beverage concentrates in addition to their requisite stability from calcium precipitation provide for a consumer acceptable beverage with good taste and mouthfeel.

Example VIII

A beverage concentrate of the present invention is prepared as follows:

| Premix 1 | |
| --- | --- |
| Ingredients | wt/wt % |
| Water | 5.52 |
| Citric and Malic Acid | 38.90 |
| Liquid Fructose | 35.65 |
| $CaCl_2 \cdot 2H_2O$ | 7.70 |
| $CaCO_3$ | 12.23 |
| | 100.00 |

1. Liquid fructose supplied by A. E. Staley having 77% solids and 23% water wherein 99% of the solids is fructose.

The citric and malic acids are dissolved in 100% of the water and liquid fructose, heating slightly while mixing and maintaining the temperature below about 100° F. (38° C.). $CaCl_2 \cdot 2H_2O$ is then dissolved in the solution. $CaCO_3$ is slowly added to the solution containing the acids and $CaCl_2 \cdot 2H_2O$, while mixing. At this point, foaming can occur. Mix until solution becomes clear and gas has evolved.

The resulting composition comprises about 7.0% soluble calcium, by weight; pH of 2.06 (measured as is); 77° Brix and a density of 1.4 calculated as specific gravity. The premix I composition is stable for at least about 4 hours at temperatures of at least about 85° F. (29° C.).

| Premix 2 | |
| --- | --- |
| Ingredients | wt/wt % |
| Strawberry WONF | 68.0 |
| Citric & Malic Acids | 2.0 |
| Water | 30.0 |
| | 100.0 |
| Combined System | |
| Premix #1 | 95.1 |
| Premix #2 | 4.9 |
| | 100.0 |

The strawberry WONF is analyzed to determine the acid content. Citric and malic acids are dissolved in water. The strawberry WONF is then added to the water to form premix 2. Premix 1 and 2 are mixed together in the proportion of 95.1% premix 1 and 4.9% premix 2. The resulting composition comprises about 6.7% soluble calcium, by weight; pH of about 4.0 (measured as is), and a °Brix of about 80°. The beverage premix concentrate is stable for at least about 4 hours at temperatures of at least about 90° F. (32° C.).

What is claimed is:

1. A process for preparing a shelf-stable beverage premix concentrate or beverage syrup, comprising the steps of:
   a) preparing a calcium fortified sugar syrup, premix 1, by a process comprising the steps of:
      (1) preparing a solution of sugar and water;
      (2) preparing a solution of citric and malic acids by dissolving said acids in water;
      (3) combining the sugar solution of (1) with the citric and malic acids of (2) with agitation; and
      (4) adding with agitation a slurry of calcium salts in water while maintaining the temperature below 120° F. until the neutralization reaction is complete and a clear solution is achieved; and
   b) preparing a beverage flavor base, premix 2, comprising a flavor component, water, citric acid and malic acid; wherein the weight ratio of citric acid and malic acid in premix 2 is in the same weight ratio as the citric acid and malic acid in premix 1 and the weight ratio of sugars to water in premix 2 is the same weight ratio of sugars to water in premix 1; and
   c) combining premix 1 and premix 2.

2. A process according to claim 1 wherein the weight ratio of citric acid to malic acid in premix 1 and premix 2 is from about 20:80 to about 80:20.

3. A process according to claim 2 wherein the weight ratio of citric acid to malic acid in premix 1 and premix 2 is about 26:74.

4. A process according claim 2 wherein the weight ratio of sugars (on a dry weight basis) to water in premix 1 and premix 2 is from about 1:5 to about 3:1.

5. A process according to claim 4 wherein the weight ratio of sugars (on a dry weight basis) to water in premix 1 and premix 2 is from about 1.5:1 to about 2:1.

6. A process according to claim 5 wherein the weight ratio of sugars (on a dry weight basis) to water in premix 1 and premix 2 is about 2:1.

7. A process according to claim 1 further comprising the step of dissolving an acidic anion source into the citric acid and malic acid solution of premix 1.

8. A process according to claim 1 further comprising the step of dissolving an acidic anion source into water and adding to the calcium slurry of premix 1.

* * * * *